United States Patent
Kwon et al.

(10) Patent No.: US 7,667,932 B2
(45) Date of Patent: Feb. 23, 2010

(54) METHOD AND APPARATUS USING EMBEDDED SENSOR IN A PIEZOELECTRIC MICRO-ACTUATOR IN A HARD DISK DRIVE

(75) Inventors: Hae-sung Kwon, San Jose, CA (US); Hyung Jai Lee, Cupertino, CA (US)

(73) Assignee: Samsung Electronics, Co., Ltd., Suwon, Kyungki-Do (KR)

(*) Notice: Subject to any disclaimer, the term of this patent is extended or adjusted under 35 U.S.C. 154(b) by 793 days.

(21) Appl. No.: 11/334,623

(22) Filed: Jan. 17, 2006

(65) Prior Publication Data
US 2007/0165333 A1 Jul. 19, 2007

(51) Int. Cl.
*G11B 5/56* (2006.01)

(52) U.S. Cl. .................................. 360/294.4
(58) Field of Classification Search .............. 360/294.4, 360/75, 78.12, 97.02
See application file for complete search history.

(56) References Cited

U.S. PATENT DOCUMENTS

| | | | |
|---|---|---|---|
| 5,189,578 A | 2/1993 | Mori et al. | |
| 5,276,573 A | 1/1994 | Harada et al. | |
| 5,282,190 A | 1/1994 | Maruo et al. | |
| 5,745,319 A | 4/1998 | Takekado et al. | |
| 5,757,573 A | 5/1998 | Tokuyama et al. | |
| 5,764,444 A | 6/1998 | Imamura et al. | |
| 5,802,914 A | 9/1998 | Fassler et al. | |
| 5,805,381 A | 9/1998 | Resh | |
| 5,943,189 A | 8/1999 | Boutaghou et al. | |
| 6,188,548 B1 | 2/2001 | Khan et al. | |
| 6,246,552 B1 | 6/2001 | Soeno et al. | |
| 6,268,983 B1 | 7/2001 | Imada et al. | |
| 6,275,454 B1 | 8/2001 | Boutaghou | |
| 6,362,933 B1 | 3/2002 | Sampietro et al. | |
| 6,501,625 B1 | 12/2002 | Boismeir et al. | |
| 6,545,846 B1 | 4/2003 | Chee et al. | |
| 6,570,730 B1 | 5/2003 | Lewis et al. | |
| 6,590,748 B2 | 7/2003 | Murphy et al. | |
| 6,611,399 B1 | 8/2003 | Mei et al. | |
| 6,950,266 B1 | 9/2005 | McCaslin et al. | |
| 7,375,911 B1 * | 5/2008 | Li et al. ........................ 360/75 |
| 2002/0118492 A1 * | 8/2002 | Watanabe et al. ......... 360/294.4 |
| 2003/0112547 A1 * | 6/2003 | Koso et al. .............. 360/78.05 |
| 2003/0231434 A1 * | 12/2003 | Mita et al. .............. 360/294.4 |
| 2004/0160703 A1 * | 8/2004 | Yamamoto et al. ...... 360/294.4 |
| 2005/0152072 A1 | 7/2005 | Kwon et al. | |

* cited by examiner

*Primary Examiner*—Angel A. Castro
(74) *Attorney, Agent, or Firm*—GSS Law Group; Earle Jennings

(57) ABSTRACT

A piezoelectric sensor-actuator, including a piezoelectric sensor bonded through non-conductive adhesive to a piezoelectric actuator to determine the pressure and/or temperature near the coupled slider. The piezoelectric actuator contributes to slider positioning. The piezoelectric sensor determines the experienced stress-strain. The hard disk drive uses the piezoelectric sensor-actuator creates a stress-strain measurement, a sensor spectrum, deriving the temperature estimate and/or the pressure estimate from said sensor spectrum, and operating at least one positioning control group member based upon the temperature estimate and/or pressure estimate. The micro-actuator containing at least one of the piezoelectric sensor-actuators, flexure finger, head gimbal assembly, head stack assembly, an actuator assembly, an embedded circuit, and the hard disk drive. The invention includes manufacturing methods and the piezoelectric sensor-actuator, the micro-actuator, the head gimbal assembly, the actuator assembly, the head stack assembly, the embedded circuit, and the hard disk drive as products.

22 Claims, 8 Drawing Sheets

METHOD AND APPARATUS USING EMBEDDED SENSOR IN A PIEZOELECTRIC MICRO-ACTUATOR IN A HARD DISK DRIVE

TECHNICAL FIELD

This invention relates to hard disk drives, in particular, to methods and apparatus estimating temperature and/or pressure near a micro-actuator inside a hard disk drive, and operating the hard disk drive based upon those estimates.

BACKGROUND OF THE INVENTION

Contemporary hard disk drives include an actuator assembly pivoting through an actuator pivot to position one or more read-write heads, embedded in sliders, each over a rotating disk surface. The data stored on the rotating disk surface is typically arranged in concentric tracks. To access the data of a track, a servo controller first positions the read-write head by electrically stimulating the voice coil motor, which couples through the voice coil and an actuator arm to move a head gimbal assembly in lateral positioning the slider close to the track. Once the read-write head is close to the track, the servo controller typically directs the read-write head to follow the track, and the read-write head is used to access data stored in the track.

Micro-actuators provide a second actuation stage for lateral positioning the read-write head while following the track. They often use an electrostatic effect and/or a piezoelectric effect to rapidly make fine position changes. They have doubled the bandwidth of servo controllers and are now believed essential for high capacity hard disk drives. This invention will focus on elements of a micro-actuator based upon the piezoelectric effect.

Contemporary hard disk drives fly the slider and its embedded read-write head within a few nanometers of the rotating disk surface during read and write access operations. The flying conditions are significantly affected by the local temperature and pressure. The temperature and pressure in the vicinity of the micro-actuator may vary from elsewhere in the hard disk drive. Apparatus and methods are needed to accurately estimate the temperature and/or the pressure near the slider and to operate a hard disk drive accordingly.

SUMMARY OF THE INVENTION

The invention includes a piezoelectric sensor-actuator, including a piezoelectric sensor bonded through a non-conductive adhesive to a piezoelectric actuator, for inclusion in a micro-actuator, to determine the pressure and/or temperature near the coupled slider. The piezoelectric actuator contributes to the positioning of the slider when stimulated by a potential difference. The piezoelectric sensor is used to determine the stress-strain experienced by the piezoelectric sensor by generating a sensor potential difference in response to experiencing the stress-strain.

The invention's hard disk drive uses the piezoelectric sensor-actuator, receiving the sensor potential difference to create a stress-strain measurement, using the stress-strain measurement to create a sensor spectrum, deriving the temperature estimate and/or the pressure estimate from the sensor spectrum, and operating at least one member of the positioning control group based upon the temperature estimate and/or pressure estimate. The positioning control group consists of each of the micro-actuators of the hard disk drive, the voice coil motor moving the read-write head included in the slider near a track on a rotating disk surface, and the spindle motor rotating a spindle shaft coupled to the disk to create the rotating disk surface. The temperature estimate is derived from a first frequency band and the pressure estimate from a second frequency band of the sensor spectrum.

The invention includes a micro-actuator containing at least one of the piezoelectric sensor-actuators, a flexure finger coupling to the micro-actuator, a head gimbal assembly containing the flexure finger coupling through the micro-actuator to the slider, an head stack assembly containing an actuator arm coupling to the head gimbal assembly, an actuator assembly containing the head stack assembly and a main flex circuit coupled to the flexure finger; an embedded circuit for coupling to the actuator assembly, and the hard disk drive including the embedded circuit coupled to the actuator assembly.

The invention includes manufacturing methods for the piezoelectric sensor-actuator, the micro-actuator, the head gimbal assembly, the head stack assembly, the actuator assembly, the embedded circuit, and the hard disk drive. The piezoelectric sensor-actuator, the micro-actuator, the head gimbal assembly, the actuator assembly, the head stack assembly, the embedded circuit, and the hard disk drive are manufacturing products.

DETAILED DESCRIPTION

This invention relates to hard disk drives, in particular, to methods and apparatus estimating temperature and/or pressure near a micro-actuator inside a hard disk drive, and operating the hard disk drive based upon those estimates.

The invention includes a piezoelectric sensor-actuator, including a piezoelectric sensor bonded through a non-conductive adhesive to a piezoelectric actuator, for use in a micro-actuator to determine the pressure and/or temperature near the slider coupled to the micro-actuator. The piezoelectric actuator contributes to the positioning of the slider when stimulated by a potential difference. The piezoelectric sensor is used to determine the stress-strain experienced by the piezoelectric sensor by generating a sensor potential difference between two sensor terminals in response to experiencing the stress-strain.

The invention includes a piezoelectric sensor-actuator, including a piezoelectric sensor bonded through a non-conductive adhesive to a piezoelectric actuator, for use in a micro-actuator to determine the pressure and/or temperature near the slider coupled to the micro-actuator. The piezoelectric actuator contributes to the positioning of the slider when stimulated by a potential difference. The piezoelectric sensor is used to determine the stress-strain experienced by the piezoelectric sensor by generating a sensor potential difference between two sensor terminals in response to experiencing the stress-strain.

The invention includes a micro-actuator containing at least one of the piezoelectric sensor-actuators, a flexure finger coupling to the micro-actuator, a head gimbal assembly containing the flexure finger coupling through the micro-actuator to the slider, an head stack assembly containing an actuator arm coupling to the head gimbal assembly, an actuator assembly containing the head stack assembly and a main flex circuit coupled to the flexure finger; an embedded circuit for coupling to the actuator assembly, and the hard disk drive including the embedded circuit coupled to the actuator assembly.

Figure 1:
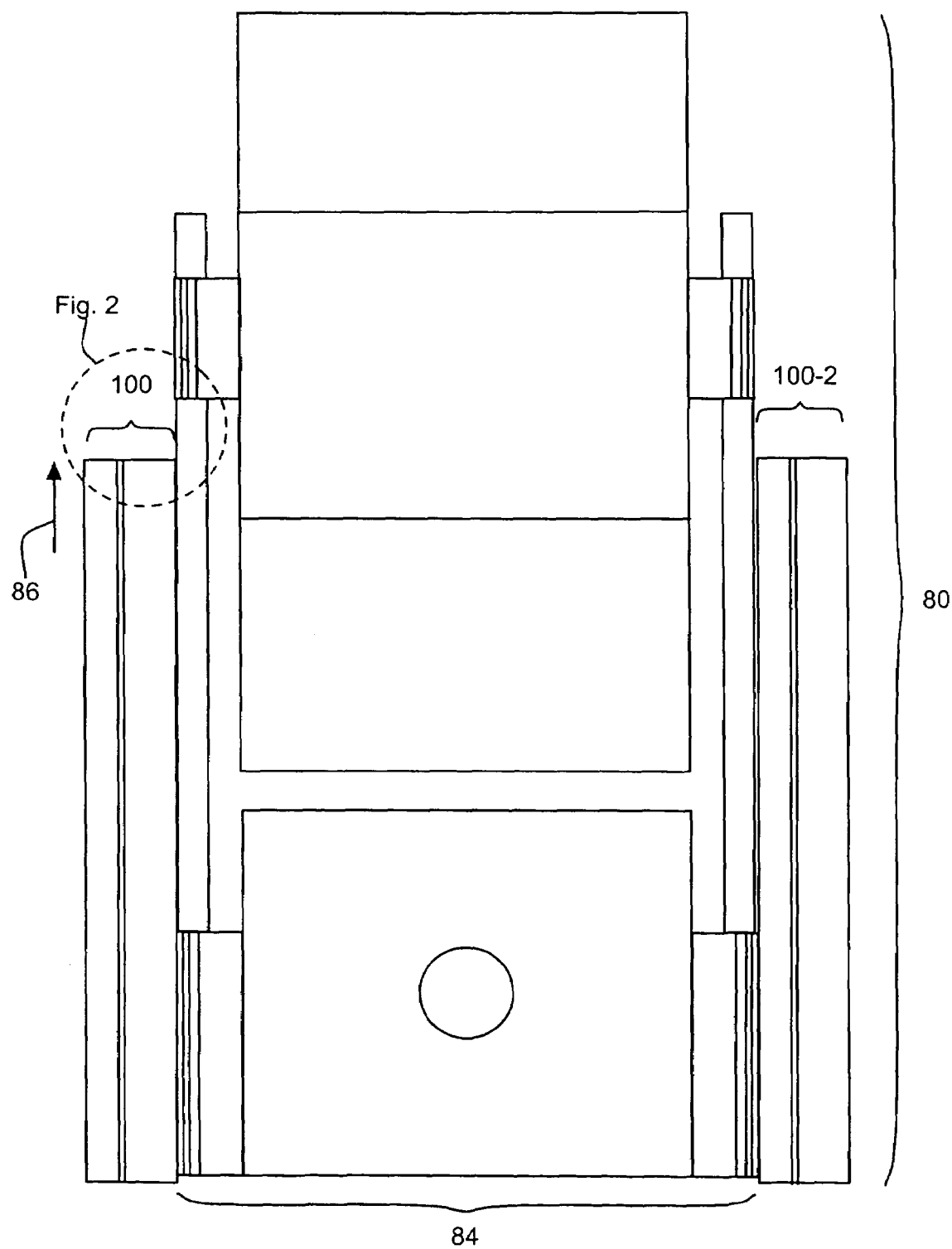
FIGS. 1 and 2 show simplified schematics micro-actuators including the piezoelectric sensor-actuator.
Figure 2:
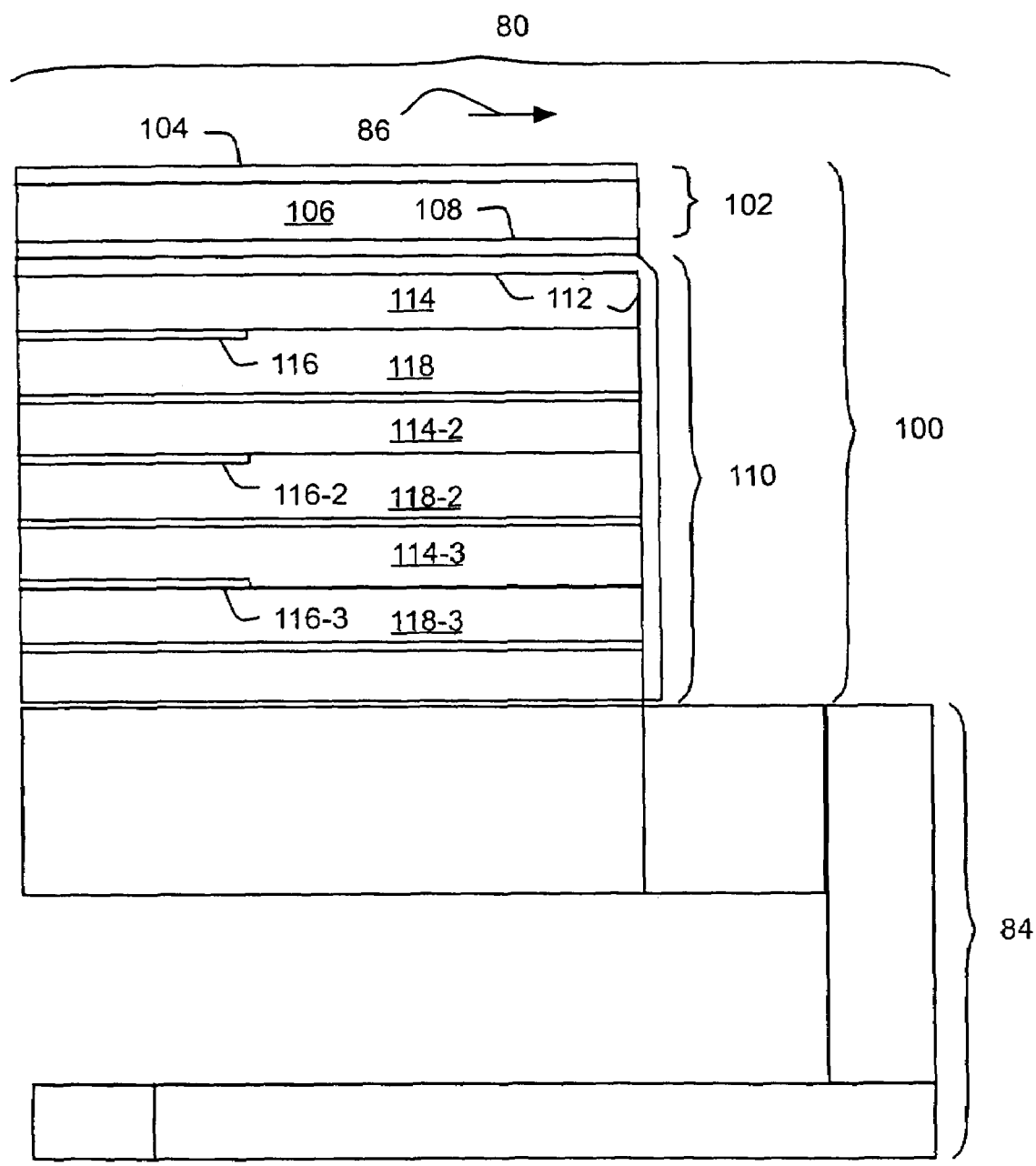
Figure 3A:
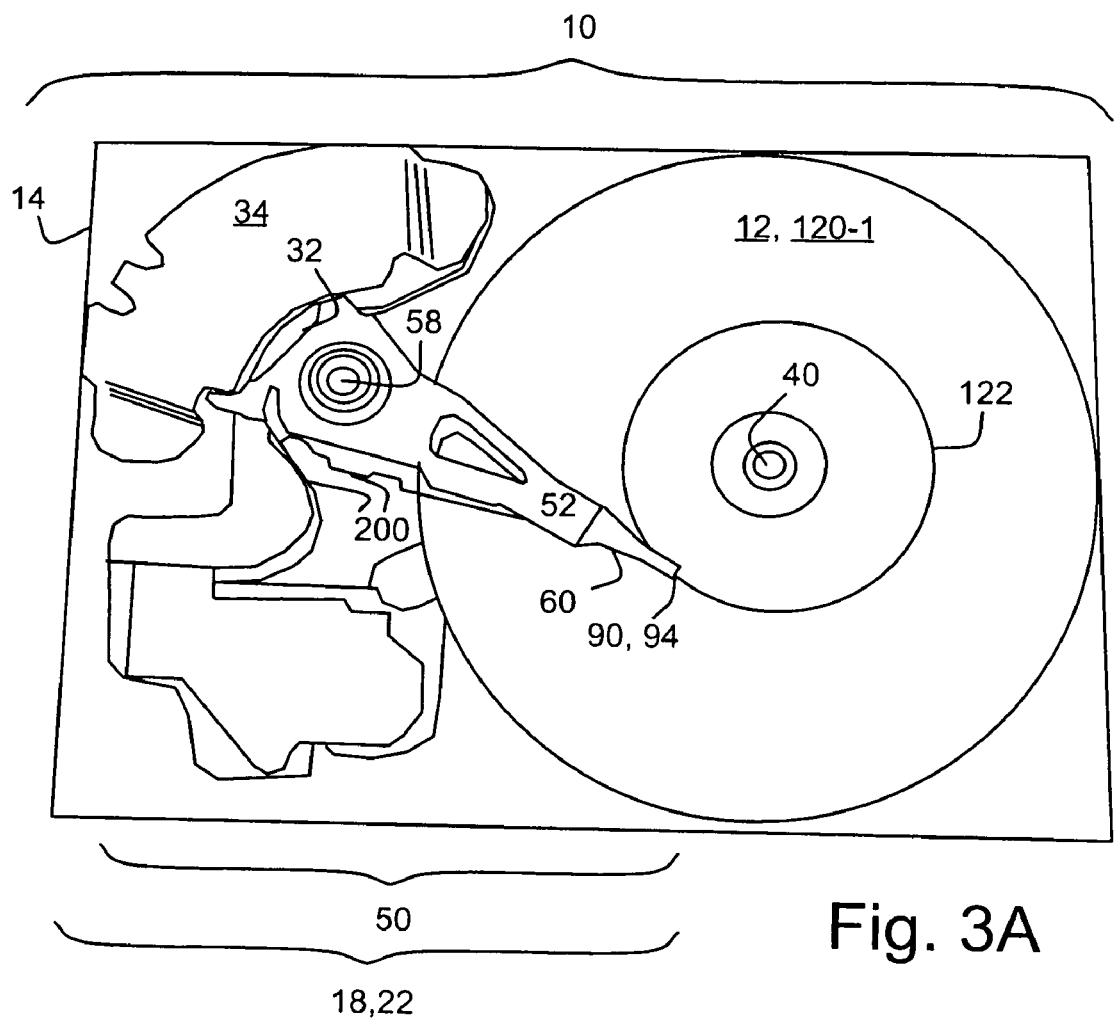
FIGS. 3A, and 5 to 7 shows various embodiments of the invention's hard disk drive.
Figure 3B:
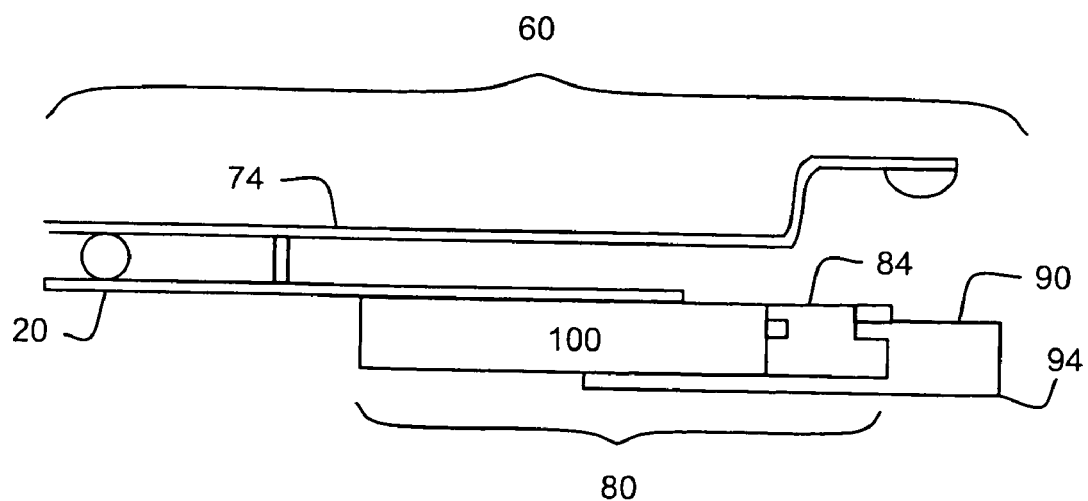
FIGS. 3B and 4 show aspects of a head gimbal assembly using the micro-actuator of FIGS. 1 and 2.

By way of example, a micro-actuator 80 is shown in FIGS. 1, 2 and 3B including at least one piezoelectric sensor-actuator 100 coupling through a micro-actuator frame 84 to contribute to the positioning of a slider 90. The piezoelectric sensor-actuator includes a piezoelectric sensor 102 bonded through a non-conductive adhesive 108 to a piezoelectric actuator 110. The non-conductive adhesive may preferably be primarily composed of an epoxy compound. The micro-actuator may include one piezoelectric sensor-actuator as shown in FIG. 3B. Alternatively, the micro-actuator may include more than one, for example, a second piezoelectric sensor-actuator 100-2, as shown in FIG. 1. In certain embodiments, exactly one of the piezoelectric sensor-actuators may be used to determine the stress strain. The principal axis 86 of the micro-actuator is shown in FIGS. 1 and 2 to help clarify these Figures of the invention.

In certain embodiments the micro-actuator may also provided vertical positioning. The micro-actuator may use a piezoelectric effect and/or an electro-static effect in providing lateral and/or vertical positioning.

The piezoelectric actuator 110 may be a bulk piezoelectric device, a bimorph piezoelectric device, and a multilayer piezoelectric structure, which is shown in FIG. 2 as the currently preferred embodiment. The potential difference is preferably applied to two actuator terminals to stimulate the piezoelectric actuator to position the slider 90 and its read-write head 94 near a track 122 on the first rotating disk surface 120-1 as shown in FIG. 3A. The actuator terminals include a first actuator terminal 112 and a second actuator terminal 116. These terminals may be implemented as electrodes in the multilayer structure. By way of example, the second terminal may further include a second terminal second electrode 116-2 and a second terminal third electrode 116-3. The piezoelectric actuator may include multiple instances 114-1, 114-2, 114-3 of a first piezoelectric actuator layer 114, and multiple instances 118-1, 118-2, and 118-3 of a second piezoelectric actuator layer 118.

The piezoelectric sensor 102 is preferably a single layer piezoelectric structure, specifically, the piezoelectric sensor layer 106, and includes two of the sensor terminal 104. The piezoelectric sensor responds to the stress-strain it experiences by generating a sensor potential difference between the sensor terminals.

Figure 4:
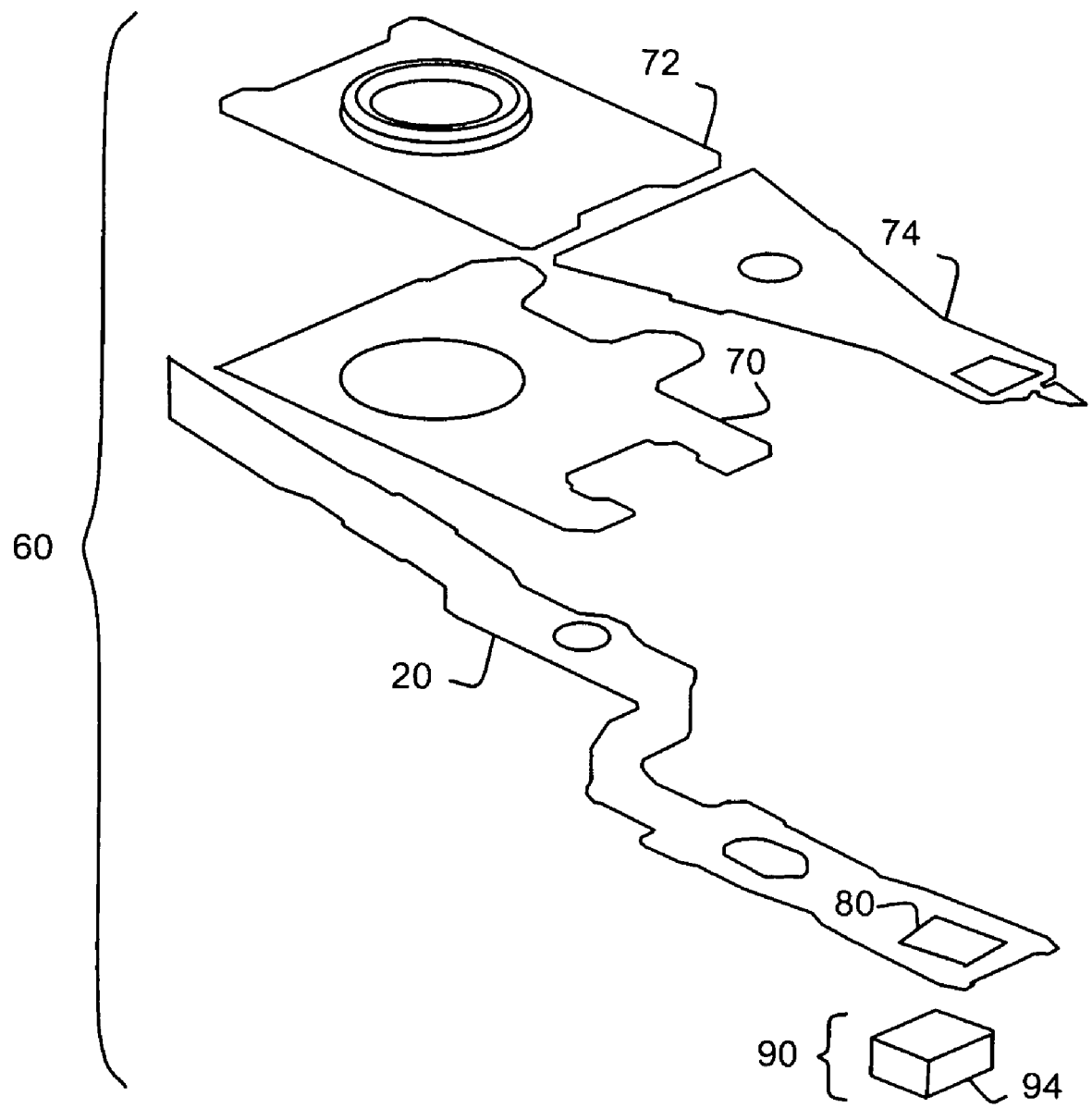

The slider 90 is mounted on a head gimbal assembly 60, which is coupled to the actuator arm 52. FIGS. 3B and 4 show a side view and an exploded view of the head gimbal assembly. The flexure finger 20 couples to the micro-actuator 80, in particular, through the micro-actuator frame 84 to the slider 90. The head gimbal assembly includes the flexure finger coupling through the micro-actuator frame to the slider. In further detail, the head gimbal assembly 60 also includes a load beam 74 coupled to the flexure finger 20. The load beam preferably couples to a base plate 72 via a hinge 70 as shown in FIG. 4.

Figure 5:
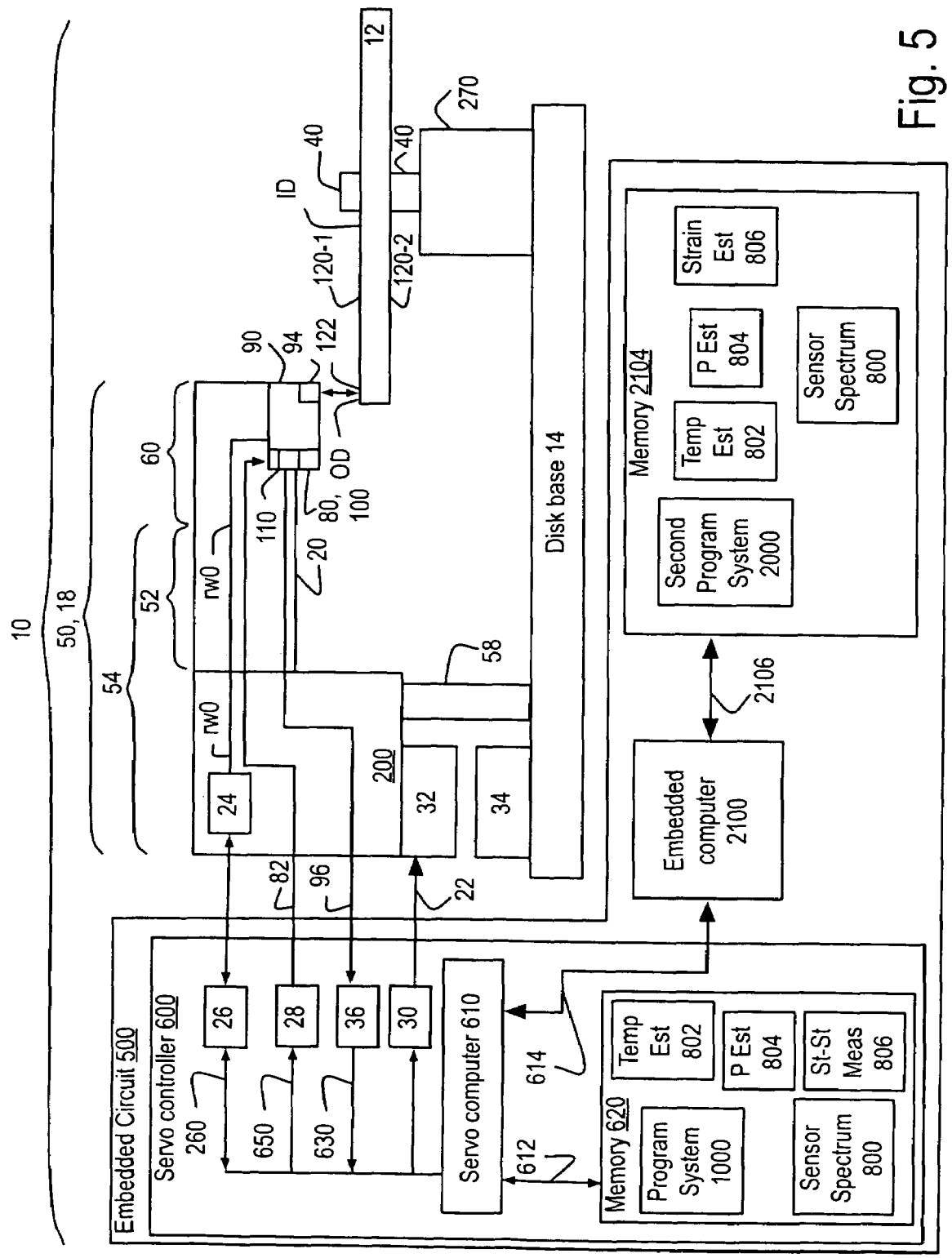
Figure 6:
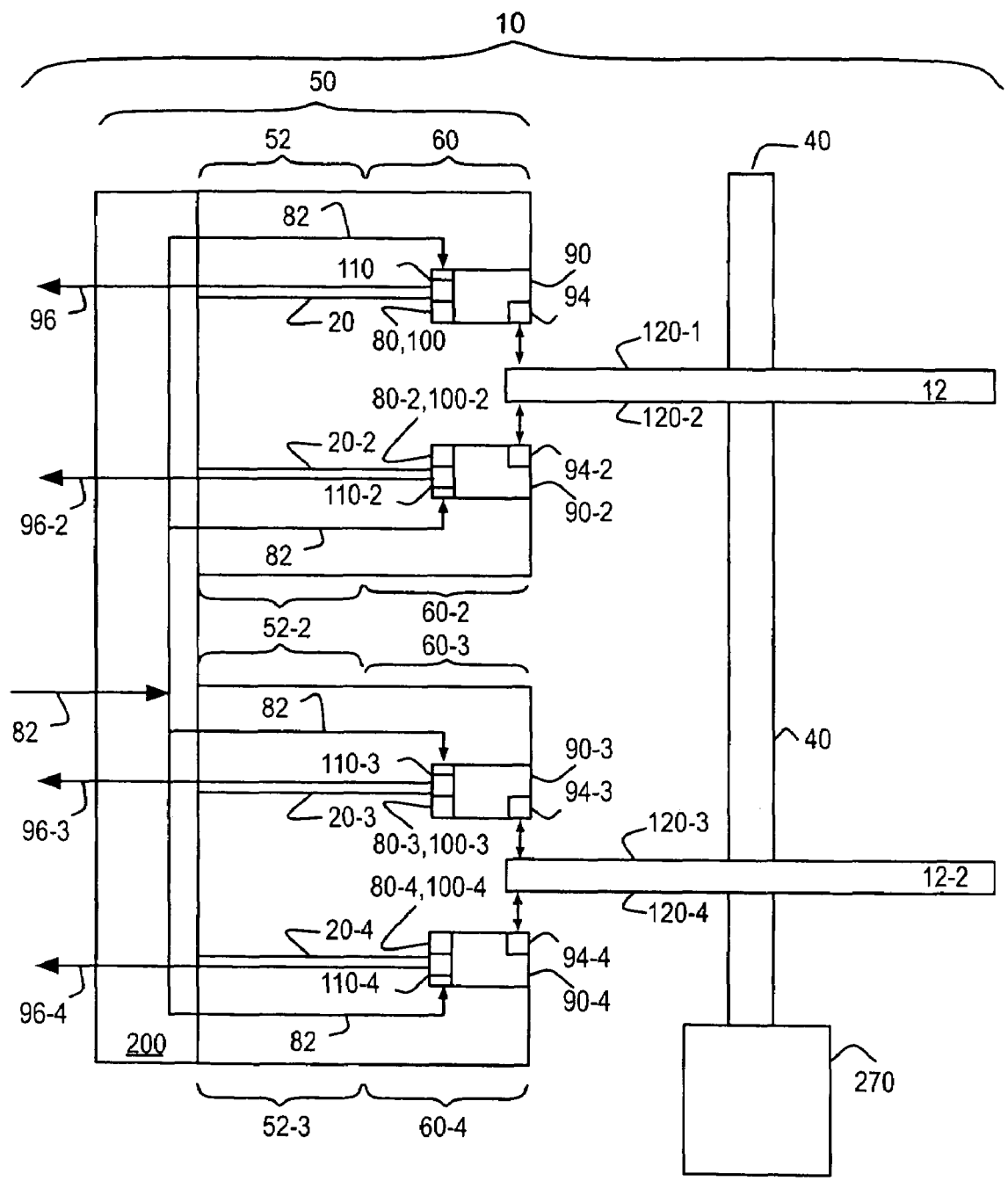
Figure 7:
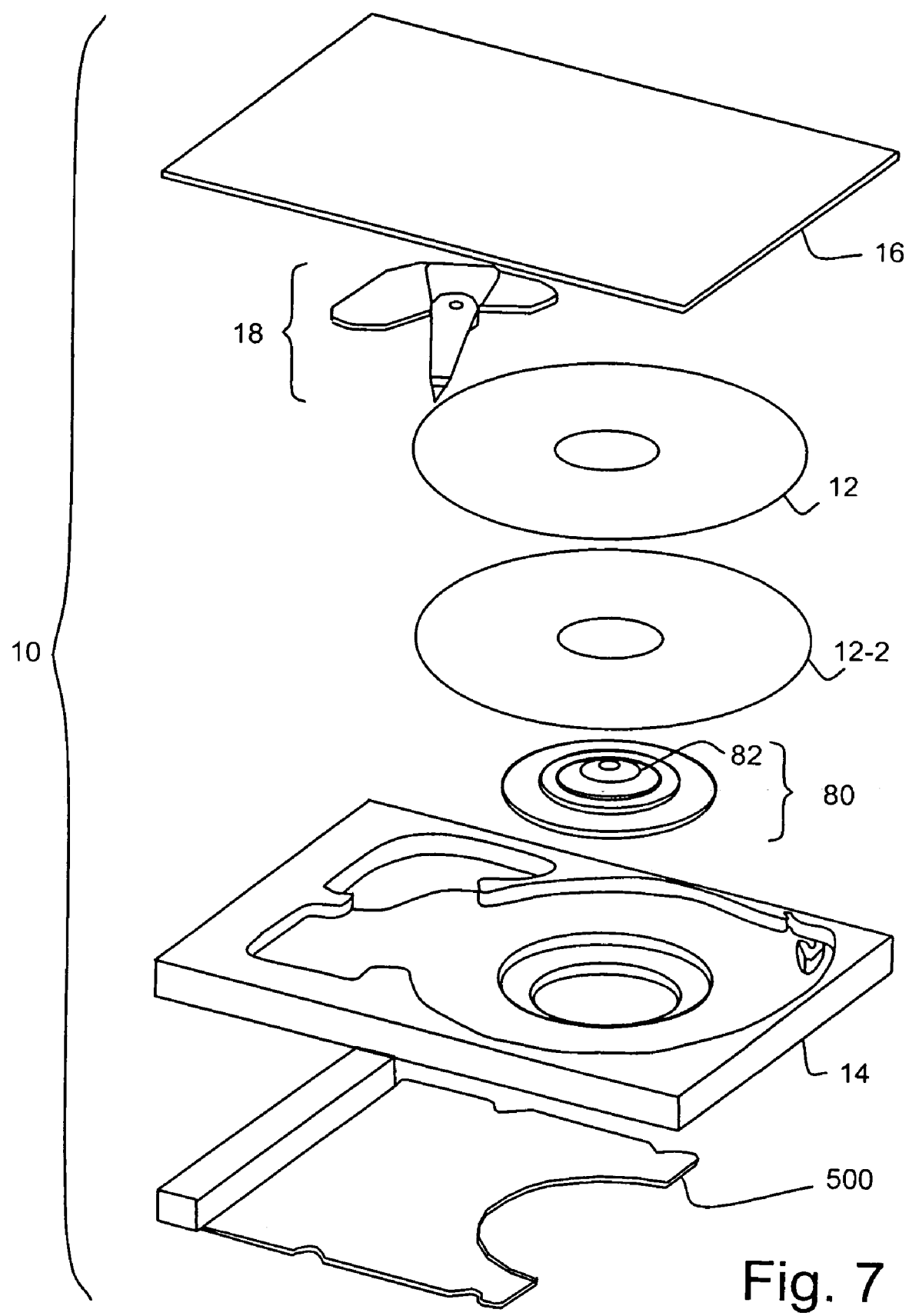

An head stack assembly 50 is shown including an actuator arm 52 coupling to the head gimbal assembly 60 in FIGS. 3A, 5 and 6. The specific coupling of the actuator arm and the head gimbal assembly is often made by a swaging process, which couples the base plate to the actuator arm.

The actuator assembly 22 is shown in FIGS. 3A and 5 to include the head stack assembly 50 and a main flex circuit 200 coupled to the flexure finger 20. The main flex circuit couples to the flexure finger by a micro-actuator control bundle 82 at least partly electrically coupled to the actuator terminals of the piezoelectric actuator 110 to provide the potential difference to the micro-actuator 80, and a sensor signal bundle 96 electrically coupled to the sensor terminals of the piezoelectric sensor 102 to receive the sensor potential difference. In various embodiments of the invention, the piezoelectric sensor-actuator 100 may contribute to the lateral positioning of the slider 90 above the disk 12, as shown in FIG. 3A. Alternatively, the piezoelectric sensor-actuator may contribute to the vertical positioning of the slider above the disk as shown in FIGS. 5 and 6.

The main flex circuit 200 may further couple to a second flexure finger 20-2, which couples through a second micro-actuator 80-2 to a second slider 90-2, as shown in FIG. 6. Additionally, the main flex circuit may further couple to a third flexure finger 20-3, which couples through a third micro-actuator 80-3 to a third slider 90-3. The main flex circuit may further couple to a fourth flexure finger 20-4, which couples through a fourth micro-actuator 80-4 to a fourth slider 90-4.

In certain embodiments of the invention, exactly one of the piezoelectric sensor-actuator 100 included in the actuator assembly 20 is used to determine the stress-strain based upon a sensor signal bundle 96 receiving the sensor potential difference from the sensor terminals 104 of the piezoelectric sensor 102, as shown in FIG. 5.

Alternatively, more than one piezoelectric sensor-actuator may be used to determine the stress strain. By way of example, FIG. 6 shows a second sensor signal bundle 96-2 receiving the sensor potential difference from the sensor terminals of a second piezoelectric sensor 102-2 included in the second micro-actuator 80-2. Similarly, a third sensor signal bundle 96-3 receives the sensor potential difference. from a third piezoelectric sensor 102-3 included in the third micro-actuator 80-3. A fourth sensor signal bundle 96-4 receiving the sensor potential difference from a fourth piezoelectric sensor 102-4 included in the fourth micro-actuator 80-4.

The invention includes an embedded circuit 500, preferably including a sensor interface 36 receiving the sensor signal bundle 96 to create a stress-strain measurement 806, a sensor spectrum 800 based upon the stress-strain measurement, and the temperature estimate 802 and/or the pressure estimate 804 based upon the sensor spectrum, as shown in FIG. 5.

The embedded circuit 500 may further include a servo controller 600, including the sensor interface 36, the stress-strain measurement 806, the sensor spectrum 800, the temperature estimate 802 and/or the pressure estimate 804.

The servo controller 600 may further include a servo computer 610 communicatively coupled 630 to the sensor interface 36 to create the stress strain measurement 806, the sensor spectrum 800, the temperature estimate 802, and the pressure estimate 804. The servo controller may further include the servo computer accessibly coupled 612 to a servo memory 620 and directed by a servo program system 1000 including program steps residing in the servo memory.

The servo controller 600 may further include an embedded computer 2100 second accessibly coupled 2106 to an embedded memory 2104 and directed by an embedded program system 2000, including at least one program step residing in the embedded memory.

A computer as used herein may include at least one instruction processor and at least one data processor, where each of the data processors is directed by at least one of the instruction processors.

The following Figures include flowcharts of at least one method of the invention possessing arrows. These arrows will signify of flow of control and sometimes data, supporting implementations including at least one program step or program thread executing upon a computer, inferential links in an inferential engine, state transitions in a finite state machine, and learned responses within a neural network.

The operation of starting a flowchart refers to at least one of the following and is denoted by an oval with the text "Start" in it. Entering a subroutine in a macro-instruction sequence in a computer. Entering into a deeper node of an inferential graph. Directing a state transition in a finite state machine, possibly while pushing a return state. And triggering at least one neuron in a neural network.

The operation of termination in a flowchart refers to at least one of the following and is denoted by an oval with the text "Exit" in it. The completion of those steps, which may result in a subroutine return, traversal of a higher node in an inferential graph, popping of a previously stored state in a finite state machine, return to dormancy of the firing neurons of the neural network.

An operation in a flowchart refers to at least one of the following. The instruction processor responds to the operation as a program step to control the data execution unit in at least partly implementing the step. The inferential engine responds to the operation as nodes and transitions within an inferential graph based upon and modifying a inference database in at least partly implementing the operation. The neural network responds to the operation as stimulus in at least partly implementing the operation. The finite state machine responds to the operation as at least one member of a finite state collection comprising a state and a state transition, implementing at least part of the operation. Often a method will be described in terms of operations in these flowcharts.

Several flowcharts include multiple operations. In certain aspects, any one of the operations may be found in an embodiment of the invention. In other aspects, multiple operations are needed in an embodiment of the invention. When multiple operations are needed, these operations may be performed concurrently, sequentially and/or in a combination of concurrent and sequential operations. The shapes of the arrows in multiple operation flowcharts may differ from one flowchart to another, and are not to be construed as having intrinsic meaning in interpreting the concurrency of the operations.

The invention's hard disk drive uses the piezoelectric sensor-actuator, receiving the sensor potential difference to create a stress-strain measurement, using the stress-strain measurement to create a sensor spectrum, deriving the temperature estimate and/or the pressure estimate from the sensor spectrum, and operating at least one member of the positioning control group based upon the temperature estimate and/or pressure estimate. The positioning control group consists of each of the micro-actuators of the hard disk drive, the voice coil motor moving the read-write head included in the slider near a track on a rotating disk surface, and the spindle motor rotating a spindle shaft coupled to the disk to create the rotating disk surface. The temperature estimate is derived from a first frequency band and the pressure estimate from a second frequency band of the sensor spectrum.

Figure 8A:
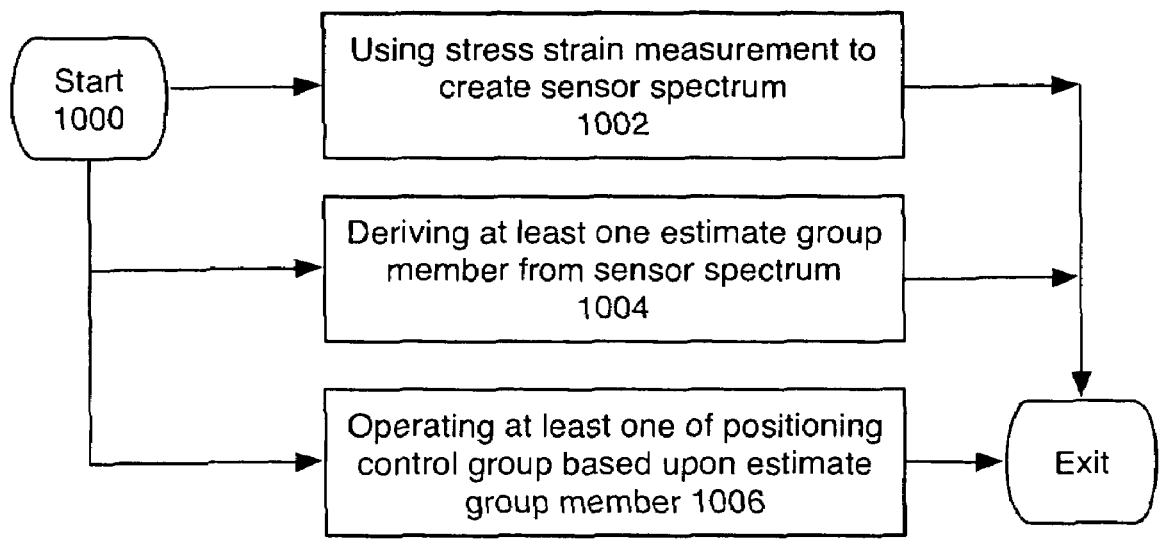
FIGS. 8A and 8B show the operation of the hard disk drive in terms of a servo program system directing a servo computer and an embedded program system directing an embedded computer.
Figure 8B:
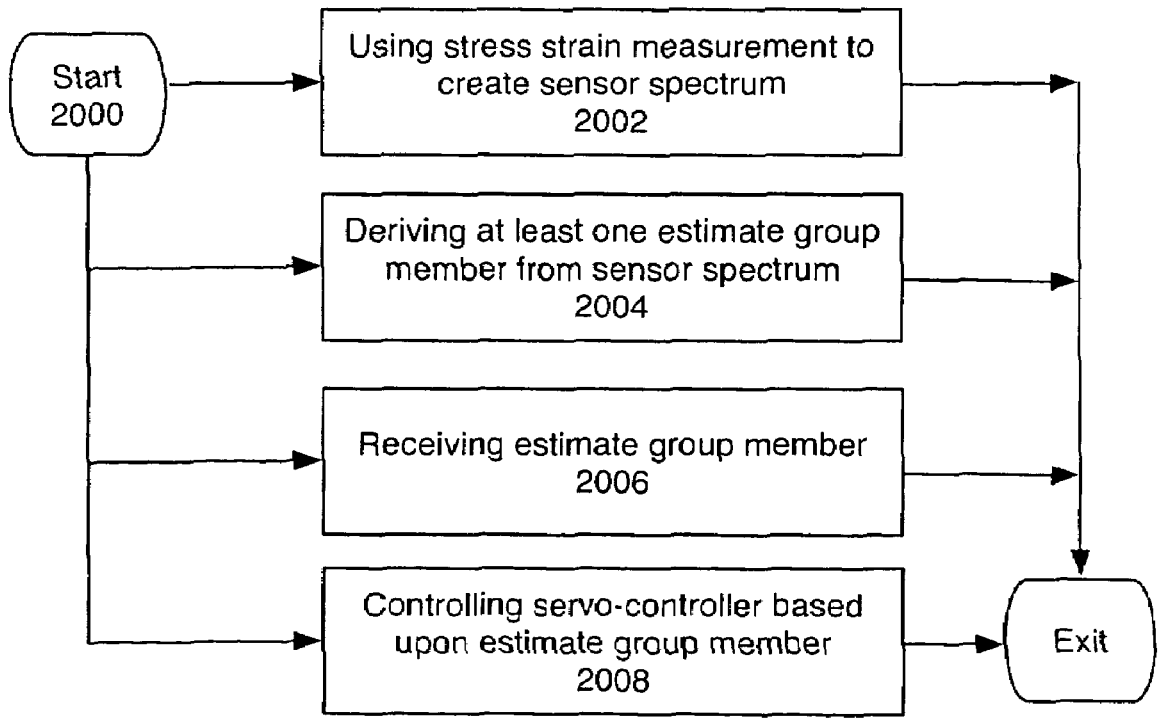

The invention's hard disk drive 10 uses at least one of the piezoelectric sensor-actuator 100, and operates as follows. These operations are summarized in FIG. 8A, for implementations using the servo computer 610 and the servo program system 1000, and in FIG. 8B for operations using the embedded control computer 2100 and the embedded program system 2000. The sensor potential difference 96 is received to create a stress-strain measurement 806. Various combinations of these operations may be employed in specific embodiments of the embedded controller.

Operation 1002 for the servo program system 1000 and 2002 for the embedded program system 2000 supports using the stress-strain measurement 806 to create a sensor spectrum 800. Operation 1004 and/or 2004 supports deriving the temperature estimate 802 and/or the pressure estimate 804 from the sensor spectrum. The temperature estimate and the pressure estimate are the estimate group members. Operation 1006 supports operating at least one member of the positioning control group based upon the temperature estimate and/or pressure estimate. Operation 2006 supports the embedded computer 2100 receiving an estimate group member. And operation 2008 supports the embedded control computer controlling the servo controller 600 based upon the estimate group member.

The positioning control group consists of each of micro-actuator 80 of the hard disk drive 10, the voice coil motor 18 including the actuator assembly 22 and moving the read-write head 94 included in the slider 90 near the track 122 on the rotating disk surface 120-1, and the spindle motor 270 rotating the spindle shaft 40 coupled to the disk 12 to create the rotating disk surface.

The invention includes manufacturing methods for the piezoelectric sensor-actuator, the micro-actuator, the head gimbal assembly, the head stack assembly, the actuator assembly, the embedded circuit, and the hard disk drive. The piezoelectric sensor-actuator 100, the micro-actuator 80, the head gimbal assembly 60, the actuator assembly 22, the head stack assembly 50, the embedded circuit 500, and the hard disk drive 10 are products of their corresponding manufacturing processes.

Manufacturing the piezoelectric sensor-actuator 100 includes bonding the piezoelectric sensor 102 through the non-conductive adhesive 108 to the piezoelectric actuator 110 to at least partly create the piezoelectric sensor-actuator. The manufacturing process may further include providing the piezoelectric sensor and/or providing the piezoelectric actuator.

Manufacturing the micro-actuator 80 includes coupling the at least one piezoelectric actuator-sensor 100 to the micro-actuator frame 84 to at least partly create the micro-actuator.

Manufacturing the head gimbal assembly 60 includes coupling the flexure finger 20 through the micro-actuator frame 84 to the slider 90.

Manufacturing the actuator assembly 22 includes providing the actuator arm 52 and the main flex circuit 200 coupled to the flexure finger 20 to at least partly create the actuator assembly.

Manufacturing the head stack assembly 50 includes coupling the actuator arm 52 to the head gimbal assembly 60 to at least partly create the head stack assembly.

Manufacturing the embedded circuit 500 includes providing the sensor interface 36 to at least partly create the embedded circuit. Manufacturing the embedded circuit, and in some embodiments, the servo controller 600, may include installing the servo computer 610 and the servo memory 620 into the servo controller and programming the servo memory with the program system 1000 to create the servo controller and/or the embedded circuit. Programming the servo memory may preferably include programming a non-volatile memory component of the servo memory.

Manufacturing the embedded circuit 500 may further include installing the embedded computer 2100 and the embedded memory 2104 and programming the embedded memory with the embedded program system 2000. Programming the embedded memory may preferably include programming a non-volatile memory component of the embedded memory.

Manufacturing the hard disk drive 10 includes coupling embedded circuit 500 to the actuator assembly 22 to at least partly create the hard disk drive. Manufacturing the hard disk drive may include coupling the servo controller 600 and/or the embedded circuit to the voice coil motor 18, providing the micro-actuator stimulus signal 650 to drive the micro-actuator 80, and the read and write differential signal pairs rw0 include a read differential signal pair from the read-write head 94 to the servo controller to generate the Position Error Signal 260.

As previously mentioned, the embedded circuit 500 may include the servo controller 600. The hard disk drive 10 may include the servo controller, and possibly the embedded circuit, coupled to the voice coil motor 18, to provide the micro-actuator stimulus signal 650 driving the micro-actuator 80, and a read differential signal pair contained in the read and write differential signal pairs rw0 from the read-write head 94 to the servo controller to generate the Position Error Signal 260.

Looking at some of the details of the Figures, the hard disk drive 10 includes a disk 12 and a second disk 12-2. The disk includes the rotating disk surface 120-1 and a second rotating disk surface 120-2. The second disk includes a third rotating disk surface 120-3 and a fourth rotating disk surface 120-4. The voice coil motor 18 includes the head stack assembly 50 pivoting through an actuator pivot 58 mounted on the disk base 14, in response to the voice coil 32 mounted on the head stack 54 interacting with the fixed magnet 34 mounted on the disk base. The actuator assembly includes the head stack with at least one actuator arm 52 coupling to a slider 90 containing the read-write head 94. The slider is coupled to the micro-actuator 80.

FIG. 6 further shows the head stack assembly 50 including more than one actuator arm 52, in particular, a second actuator arm 52-2 and a third actuator arm 52-3. Each of the actuator arms is coupled to at least one slider, in particular, the second actuator arm couples to a second slider 90-2 and a third slider 90-3, and the third actuator arm couples to a fourth slider 90-4. Each of these sliders contains a read-write head, for example, the second slider contains the second read-write head 94-2, the third slider contains the third read-write head 94-3, and the fourth slider contains the fourth read-write head 94-4. Each of these sliders is preferably coupled to a micro-actuator, for example, the second slider is coupled to the second micro-actuator 80-2, the third slider is coupled to the third micro-actuator 80-3, and the fourth slider is coupled to the fourth micro-actuator 80-4.

The read-write head 94 interfaces through a preamplifier 24 on a main flex circuit 200 using a read and write differential signals rw0 typically provided by the flexure finger 20, to a channel interface 26 often located within the servo controller 600. The channel interface often provides the Position Error Signal 260 (PES) within the servo controller 600. It may be preferred that the micro-actuator stimulus signal 650 be shared when the hard disk drive 10 includes more than one micro-actuator. It may be further preferred that the micro-actuator control bundle 82 be shared, as shown in FIG. 6. Typically, each read-write head interfaces with the preamplifier using a separate read and write differential signal pair, typically provided by a separate flexure finger. For example, the second read-write head 94-2 interfaces with the preamplifier via a second flexure finger 20-2, the third read-write head 94-3 via the a third flexure finger 20-3, and the fourth read-write head 94-4 via a fourth flexure finger 20-4.

During normal disk access operations, the embedded circuit 500 and/or the servo controller 600 direct the spindle motor 270 to rotate the spindle shaft 40. This rotating is very stable, providing a nearly constant rotational rate through the spindle shaft to at least one disk 12, and as shown in some of the Figures, sometimes more than one disk. The rotation of the disk creates the rotating disk surface 120-1, used to access the track 122 during track following mode, as discussed elsewhere. These accesses normally provide for reading the track and/or writing the track.

Returning to FIG. 8C, the actuator arm 52 couples through the head gimbal assembly 60 to the slider 90, its read-write head 94, the micro-actuator 80 and the flexure finger 20 electrically coupling. the micro-actuator control bundle 82 to the micro-actuator. The second actuator arm 52-2 couples through the second head gimbal assembly 60-2 to the second slider 90-2, its second read-write head 94-2, the second micro-actuator 80-2 and the second flexure finger 20-2 electrically coupling the micro-actuator control bundle to the second micro-actuator. The second actuator arm 52-2 also couples through the third head gimbal assembly 60-3 to the third slider 90-3, its third read-write head 94-3, the third micro-actuator 80-3 and the third flexure finger 20-3 electrically coupling the micro-actuator control bundle to the third micro-actuator. The third actuator arm 52-3 couples through the fourth head gimbal assembly 60-4 to the fourth slider 90-4, its fourth read-write head 94-4, the fourth micro-actuator 80-4 and the fourth flexure finger 20-4 electrically coupling the micro-actuator control bundle to the fourth micro-actuator.

The preceding embodiments provide examples of the invention and are not meant to constrain the scope of the following claims.

What is claimed is:

1. A piezoelectric actuator-sensor, comprising:
   a piezoelectric actuator;
   a piezoelectric sensor bonded through a non-conductive adhesive to the piezoelectric actuator;
   wherein said piezoelectric actuator-sensor is used in a micro-actuator coupled to a slider of a disk drive, comprises:
   said piezoelectric actuator contributes to the positioning of said slider when a potential difference is applied between two actuator terminals; and
   wherein said piezoelectric sensor generates a potential difference between two sensor terminals when experiencing a stress-strain that is used by said hard disk drive to derive at least one member of an estimate group consisting of a temperature estimate and a pressure estimate used to at least partly control said piezoelectric actuator.

2. The piezoelectric actuator-sensor of claim 1, wherein said piezoelectric actuator is a member of the group consisting of: a bulk piezoelectric device, a bimorph piezoelectric device, and a multilayer piezoelectric structure.

3. The piezoelectric actuator-sensor of claim 1, wherein said piezoelectric sensor is a single layer piezoelectric structure.

4. The micro-actuator of claim 1, comprising: at least one of said piezoelectric actuator-sensors coupling through a micro-actuator frame to contribute to said positioning of said slider.

5. A flexure finger coupling to said micro-actuator of claim 4 through said micro-actuator frame.

6. A head gimbal assembly, comprising: said flexure finger of claim 5 coupling through said micro-actuator frame to said slider.

7. An head stack assembly, comprising: an actuator arm coupling to said head gimbal assembly of claim 6.

8. An actuator assembly, comprising: said head stack assembly of claim 7 and a main flex circuit coupled to said flexure finger;
   wherein said main flex circuit coupled to said flexure finger comprises:
   a micro-actuator control bundle at least partly electrically coupled to said actuator terminals to provide said potential difference; and
   a sensor signal bundle electrically coupled to said sensor terminals to receive said sensor potential difference across.

9. The actuator assembly of claim 8, wherein said piezoelectric sensor-actuator contributes to vertical positioning of said slider above a disk.

10. The actuator assembly of claim 8, said piezoelectric sensor-actuator contributes to lateral positioning of said slider above a disk.

11. The actuator assembly of claim 10, further comprising a second of said piezoelectric sensor-actuators.

12. The actuator assembly of claim 11, wherein exactly one of said piezoelectric sensors included in said piezoelectric sensor-actuator and said second piezoelectric sensor-actuator is used to determine said stress-strain.

13. The actuator assembly of claim 8, further comprising: said main flexure coupling to a second of said flexure fingers coupling through a second of said micro-actuators to a second of said sliders.

14. The actuator assembly of claim 13, wherein said main flex circuit coupling to said second flexure finger, further comprises:
   said micro-actuator control bundle electrically coupling to said first actuator terminal and said second actuator terminal, both of said piezoelectric actuator included in said second micro-actuator to said potential difference to said second piezoelectric actuator.

15. The actuator assembly of claim 13, wherein exactly one of said piezoelectric sensors included in said micro-actuator and in said second micro-actuator is used to determine said stress-strain.

16. The actuator assembly of claim 13, wherein said main flex circuit coupling to said second flexure finger, further comprises:
   a second of said sensor signal bundles electrically coupled to said terminals of said piezoelectric sensor included in said second micro-actuator.

17. An embedded circuit for coupling to said actuator assembly of claim 8, comprising:
   a sensor interface receiving said sensor signal bundle to create a stress-strain measurement;
   a sensor spectrum based upon said stress-strain measurement;
   said at least one member of the estimate group, both based upon said sensor spectrum.

18. The embedded circuit of claim 17, further comprising:
   a servo controller including said sensor interface, said stress strain measurement, said sensor spectrum, and at least one member of the estimate group.

19. The embedded circuit of claim 18, wherein said servo controller, further comprises:
   a servo computer communicatively coupled with said sensor interface to create said stress strain measurement, said sensor spectrum, said temperature estimate, and said pressure estimate.

20. The embedded circuit of claim 19, wherein said servo controller, further comprises:
   said servo computer accessibly coupled to a servo memory and directed by a servo program system including program steps residing in said servo memory;
   wherein said servo program system, comprises the program steps of:
   using said stress strain measurement to create said sensor spectrum;
   deriving at least one member of the estimate group from said sensor spectrum; and
   operating at least one member of the positioning control group based upon at least one member of said estimate group;
   wherein said positioning control group, consists of:
   each of said micro-actuators included in said actuator assembly;
   a voice coil motor including said actuator assembly, and moving said actuator arm to position a read-write head included in said slider near a track on a rotating disk surface included in said disk; and
   a spindle motor rotating a spindle shaft coupled to said disk to create said rotating disk surface.

21. The embedded circuit of claim 17, further comprising:
   an embedded control computer receiving at least one of the group, consisting of: said stress strain measurement, said sensor spectrum, said temperature estimate, and said pressure estimate;
   wherein said embedded computer is accessibly coupled to an embedded memory and is directed by an embedded program system including at least one program step residing in said embedded memory;
   wherein said embedded program system, comprises the program step:
   controlling said servo controller based upon at least one member of the estimate group;
   wherein said estimate group, consists of: said temperature estimate and said pressure estimate.

22. The hard disk drive, comprising the embedded circuit of claim 17 coupling to said actuator assembly.

* * * * *